(12) United States Patent
Edwards et al.

(10) Patent No.: US 6,370,553 B1
(45) Date of Patent: Apr. 9, 2002

(54) ATOMIC AND MOLECULAR DOCUMENTS

(75) Inventors: Warren K. Edwards; James P. Dourish, both of San Francisco; Anthony G. LaMarca, Redwood City; John O. Lamping, Los Altos; Karin Petersen, Palo Alto; Michael P. Salisbury, Mountain View; Douglas B. Terry, San Carlos; James D. Thornton, Redwood City, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/144,143

(22) Filed: Aug. 31, 1998

(51) Int. Cl.[7] .............................................. G06F 17/21
(52) U.S. Cl. ...................... 707/514; 707/10; 707/104.1
(58) Field of Search ................................ 707/501, 513, 707/514, 515, 10

(56) References Cited

PUBLICATIONS

Interposition Agents: Transparently Interposing User Code at the System Interface, Michael B. Jones, (Microsoft Research, Microsoft Corp.).

SLIC: An Extensibility System for Commodity Operating Systems, Ghormley et al., (Computer Science Division, Univ. of CA at Berkley).

Finding and Reminding: File Organization From the Desktop, Barreau et al., (SIGCHI, vol. 27, No. 3, Jul. 1995).

Finding and Reminding, Reconsidered, Fertig et al., (SIGCHI, vol. 28, No. 1, Jan. 1996).

Information Visualization Using 3D Interactive Animation, Robertson et al., (Communications of the ACM, vol. 36, No. 4, Apr. 1993).

Using a landscape Metaphor to Represent a Corpus of Documents, Matthew Chalmers, (Rank Xerox EuroPARC, in Proc. European Conf. on Spatial Information Theory Elba, Sep. 1993).

Lifestreams: Organizing Your Electronic Life, Freeman et al., (Yale University, Dept of Computer Science).

Semantic File Systems, Gifford et al., (Programming Systems Research Group, 1991 ACM 0–89791–447–3/91/0009/ 0016).

The Digital Library Integrated Task Enironment (DLITE), Cousins et al., (Stanford University / Xerox PARC).

A Pile Metaphor for Supporting Casual Organization Of Information, Mander et al., (Chi '92, 1992 ACM 0–89791–513–5/92/0005–0627).

Representing Information About Files, Jeffrey Mogul, (Computer Science Dept., Stanford, University, CH2021–4/ 84/000/0432$01.00 1984 IEEE).

*Primary Examiner*—Jean R. Homere
*Assistant Examiner*—Luke S Wassum
(74) *Attorney, Agent, or Firm*—Fay, Sharpe, Fagan, Minnich & McKee, LLP

(57) ABSTRACT

A molecular document comprised of atomic documents located in a document management system is provided. The molecular document is generated within the environment of a document management system which separates the content of a document from the properties which are used to describe the document. The document management system further includes bit providers which retrieve the content portion of the document and deliver it to the document. The bit provider of the present invention is a specialized bit provider having the capability of retrieving full-fledged DMS-type documents. Particularly, the atomic documents of the present invention are stand-alone fully functional DMS-type documents which become the content of the molecular document. A user of the DMS is unaware of the fact that a document retrieved is, in fact, a molecular document.

18 Claims, 11 Drawing Sheets

ATOMIC AND MOLECULAR DOCUMENTS

The following applications are related to the present invention:

U.S. Ser. No. 09/143802, Anthony G. LaMarca, et al., entitled USER LEVEL ACCESSING OF LOW-LEVEL COMPUTER SYSTEM OPERATIONS; U.S. Ser. No. 09/143551, Karin Petersen, et al., entitled PROPERTY-BASED USER LEVEL DOCUMENT MANAGEMENT; U.S. Ser. No. 09/143778, Douglas B. Terry, et al., entitled A PROPERTY-BASED MECHANISM FOR FLEXIBLY SUPPORTING FRONT-END AND BACK-END COMPONENTS HAVING DIFFERENT COMMUNICATION PROTOCOLS; U.S. Ser. No. 09/143555, Michael P. Salisbury, et al, entitled VIRTUAL DOCUMENTS; U.S. Ser. No. 09/144383, John O. Lamping, et al, entitled SELF CONTAINED DOCUMENT MANAGEMENT BASED ON DOCUMENT PROPERTIES; U.S. Ser. No. 09/143773, James D. Thornton, et al., entitled SERVICE INTERACTION USING PROPERTIES ATTACHED TO DOCUMENTS; U.S. Ser. No. 09/144231, James P. Dourish, et al., entitled ACTIVE PROPERTIES FOR DYNAMIC SYSTEM CONFIGURATION; U.S. Ser. No. 09/143777, Warren K. Edwards, et al., entitled EXTENDING APPLICATION BEHAVIOR THROUGH DOCUMENT PROPERTIES; U.S. Ser. No. 09/143772, Michael P. Salisbury, et al., entitled MAINTAINING DOCUMENT IDENTITY ACROSS FILE SYSTEM INTERFACES; U.S. Ser. No. 09/144032, Anthony G. LaMarca, et al, entitled CLUSTERING RELATED FILES IN A DOCUMENT MANAGEMENT SYSTEM.

BACKGROUND OF THE INVENTION

The inventors have recognized that a large amount of a user's interaction with a computer has to do with document management, such as storing, filing, organizing and retrieving information from a variety of electronic documents. These documents may be found on a local disc, on a network system file server, an e-mail file server, the world wide web, or a variety of other locations. Modern communication delivery systems have had the effect of greatly increasing the flow of documents which may be incorporated within a user's document space, thereby increasing the need for better tools to visualize and interact with the accumulated documents.

The most common tools for organizing a document space rely on a single fundamental mechanism known as hierarchical storage systems, wherein documents are treated as files that exist in directories or folders, which are themselves contained in other directories, thereby creating a hierarchy that provides the structure for document space interactions. Each directory in a hierarchy of directories, will commonly contain a number of individual files. Typically, files and directories are given alpha-numeric, mnemonic names in large storage volumes shared via a network. In such a network, individual users may be assigned specific directories.

A file located in a sub-directory is located by its compound path name. For example, the character string D:TREE\LIMB\BRANCH\TWIG\LEAF.FIL could describe the location of a file LEAF.FIL whose immediate directory is TWIG and which is located deep in a hierarchy of files on the drive identified by the letter D. Each directory is itself a file containing file name, size, location data, and date and time of file creation or changes.

Navigation through a file system, to a large degree, can be considered as navigation through semantic structures that have been mapped onto the file hierarchy. Such navigation is normally accomplished by the use of browsers and dialog boxes. Thus, when a user traverses through the file system to obtain a file (LEAF.FIL), this movement can be seen not only as a movement from one file or folder to another, but also as a search procedure that exploits features of the documents to progressively focus on a smaller and smaller set of potential documents. The structure of the search is mapped onto the hierarchy provided by the file system, since the hierarchy is essentially the only existing mechanism available to organize files. However, documents and files are not the same thing.

Since files are grouped by directories, associating a single document with several different content groupings is cumbersome. The directory hierarchy is also used to control the access to documents, with access controls placed at every node of the hierarchy, which makes it difficult to grant file access to only one or a few people. In the present invention, separation of a document's inherent identity from its properties, including its membership in various document collections, alleviates these problems.

Other drawbacks include that existing hierarchical file systems provide a "single inheritance" structure. Specifically, files can only be in one place at a time, and so can occupy only one spot in the semantic structure. The use of links and aliases are attempts to improve upon such a limitation.

Thus, while a user's conception of a structure by which files should be organized may change over time, the hierarchy described above is fixed and rigid. While moving individual files within such a structure is a fairly straight-forward task, reorganizing large sets of files is much more complicated, inefficient and time consuming. From the foregoing it can be seen that existing systems do not address a user's need to alter a file structure based on categories which change over time. At one moment a user may wish to organize the document space in terms of projects, while at some time in the future the user may wish to generate an organization according to time and/or according to document content. A strict hierarchical structure does not allow management of documents for multiple views in a seamless manner resulting in a decrease in the efficiency of document retrieval.

Existing file systems also support only a single model for storage and retrieval of documents. This means a document is retrieved in accordance with a structure or concepts given to it by its author. On the other hand, a user who is not the author may wish to retrieve a document in accordance with a concept or grouping different from how the document was stored.

Further, since document management takes place on a device having computational power, there would be benefits to harnessing the computational power to assist in the organization of the documents. For example, by attaching a spell-checker property to a document, it can extend the read operation of a document so that the content returned to the requesting application will be correctly spelled. The inventors are aware that others have studied the area of document management/storage systems.

DMA is a proposed standard from AIIM designed to allow document management systems from different vendors to interoperate. The DMA standard covers both client and server interfaces and supports useful functionality including collections, versioning, renditions, and multiple-repository search. A look at the APIs show that DMA objects (documents) can have properties attached to them. The properties are strongly typed in DMA and must be chosen from a limited set (string, int, date . . . ). To allow for rich kinds of properties, one of the allowable property types is another DMA object. A list type is allowed to build up big properties. Properties have a unique IDs in DMA. Among the differences which exist to the present invention, is the properties are attached to documents without differentiation about which user would like to see them; properties are stored in the document repository that provides the DMA interface, not independently from it. Similarly, DMA does not provide support for active properties.

WebDAV is another interface designed to allow an extended uniform set of functionality to be attached with documents available through a web server. WebDAV is a set of extensions to the HTTP 1.1 protocol that allow Web clients to create and edit documents over the Web. It also defines collections and a mechanism for associating arbitrary properties with resources. WebDAV also provides a means for creating typed links between any two documents, regardless of media type where previously, only HTML documents could contain links. Compared to the present invention, although WebDAV provides support for collections, these are defined by extension (that is all components have to be explicitly defined); and although it provides arbitrary document properties, these live with the document itself and cannot be independently defined for different users, furthermore there is no support for active properties and are mostly geared toward having ASCII (or XML) values.

DocuShare is a simple document management system built as a web-server by Xerox Corporation. It supports simple collections of documents, limited sets of properties on documents and support for a few non-traditional document types like calendars and bulletin boards. It is primarily geared toward sharing of documents of small, self-defined groups (for the latter, it has support to dynamically create users and their permissions.) DocuShare has notions of content providers, but these are not exchangeable for a document. Content providers are associated with the type of the document being accessed. In DocuShare properties are static, and the list of properties that can be associated with a document depends on the document type. Users cannot easily extend this list. System administrators must configure the site to extend the list of default properties associated with document types, which is another contrast to the present invention. Also, in DocuShare properties can be visible to anyone who has read access for the collection in which the document is in. Properties are tightly bound to documents and it is generally difficult to maintain a personalized set of properties for a document, again a different approach than the one described in the present invention.

An operating system "SPIN" from the University of Washington allows users to inject code into the kernel that is invoked when an appropriate system call or system state occurs (For example, users can inject code that alters paging decision.). Their technology could be used to make it possible to inject code into the file system to invoke a user's code on read and write. Among the differences between SPIN and the concepts of present invention are that code injected into SPIN runs at the kernel level and users can only express their behaviors in a restricted, safe language in which it is not possible to do "bad things." As such, expressiveness is limited. On the other hand, the properties in the present invention run at the user level, and can have GUIs call out to third party libraries and in general be far more expressive than a kernel injected spindle. Further, the properties of the present invention are expressed in terms of documents, as in "I attach property X to Document Y." The SPIN system, on the other hand, extends a system call such as "read" on all files. The example document specific behaviors mentioned above are more easily mapped into a system such as the present invention in which properties are explicitly attached to individual documents.

Other works which have been done which allow operating system calls to be extended into user's code include, the article "Interposition Agents: Transparently Interposing User Code and System Interface," by Michael B. Jones in Proceedings of the $14^{th}$ Symposium on Operating Systems, Principles, Ashville, N.C., December, 1993, pages 80–93. The article "SLIC: An Extensibility System for Commodity Operating Systems," by Douglas P. Ghormley, Steven H. Rodriguez, David Petrou, Thomas E. Anderson, which is to appear in the USENIX 1998 Annual Technical Conference, New Orleans, La., June 1998.

Further, Windows NT (from Microsoft) has a function called "Filter Drivers" which, once installed, can see the accesses made to a file system. Like SPIN, a filter driver is involved on operations on all filters instead of on a document by document basis. Furthermore, installing filter drivers is a privileged operation, it is not available to normal users. As such, a user level mechanism, such as the document properties of the present invention and event dispatching architecture would be needed to allow users to express their desired behaviors.

There are also systems which, in a very specific domain, allow users to apply behaviors when documents are accessed. An example is the Tandem e-mail system, which has a "screen cobol" language and has hooks to find out when things occur. This system allows users to code filters to do custom operations when documents arrive and/or read. One of the differences between this system and the present invention, is that that system solves the problem in a specific domain and invokes only the user's behaviors when the documents are accessed via the mail application. In the present invention, the behaviors are invoked regardless of the application and regardless of the interface.

The paper, "Finding and Reminding: File Organization From the Desktop", D. Barreau and B. Nardi, SIGCHI Bulletin, 27 (3) July, 1995, reviews filing and retrieval practices and discusses the shortcomings of traditional file and retrieval mechanisms. The paper illustrates that most users do not employ elaborate or deep filing systems, but rather show a preference for simple structures and "location-based searches", exploiting groupings of files (either in folders, or on the computer desktop) to express patterns or relationships between documents and to aid in retrieval.

In response to the Barreau article, the article, "Find and Reminding Reconsidered", by S. Fertig, E. Freeman and D. Gelermter, SIGCHI Bulletin, 28(1) January, 1996, defends deep structure and search queries, observing that location-based retrieval is, "nothing more than a user-controlled logical search." There is, however, one clear feature of location-based searching which adds to a simple logical search—in a location-based system, the documents have been subject to some sort of pre-categorization. Additional structure is then introduced into the space, and this structure is exploited in search and retrieval.

The article "Information Visualization Using 3D Interactive Animation", by G. Robertson, S. Card and J. Mackinlay, Communications of the ACM 36 (4) April, 1993, discusses a location-based structure, an interesting feature is that it is exploited perceptually, rather than cognitively. This moves the burden of retrieval effort from the cognitive to the perceptual system. While this approach may be effective, the information that the systems rely on is content-based, and extracting this information to find the structure can be computationally expensive.

The article "Using a Landscape Metaphor to Represent a Corpus of Documents, " Proc. European Conference on Spatial Information Theory, Elba, September, 1993, by M. Chalmers, describes a landscape metaphor in which relative document positions are derived from content similarity metrics.

A system, discussed in "Lifestreams: Organizing your Electronic Life", AAAI Fall Symposium: AI Applications in Knowledge Navigation on Retrieval (Cambridge, Mass.), E. Freeman and S. Fertig, November, 1995, uses a timeline as the major organizational resource for managing document spaces. Lifestreams is inspired by the problems of a standard single-inheritance file hierarchy, and seeks to use contextual information to guide document retrieval. However, Lifestreams replaces one superordinate aspect of the document (its location in the hierarchy) with another (its location in the timeline).

The article "Semantic File Systems" by Gifford et al., Proc. Thirteenth ACM Symposium of Operating Systems Principals (Pacific Grove, Calif.) October, 1991, introduces the notion of "virtual directories" that are implemented as dynamic queries on databases of document characteristics. The goal of this work was to integrate an associating search/retrieval mechanism into a conventional (UNIX) file system. In addition, their query engine supports arbitrary "transducers" to generate data tables for different sorts of files. Semantic File System research is largely concerned with direct integration into a file system so that it could extend the richness of command line programming interfaces, and so it introduces no interface features at all other than the file name/query language syntax. In contrast, the present invention is concerned with a more general paradigm based on a distributed, multi-principal property-based system and with how interfaces can be revised and augmented to deal with it; the fact that the present invention can act as a file system is simply in order to support existing file system-based applications, rather than as an end in itself.

DLITE is the Stanford Digital Libraries Integrated Task Environment, which is a user interface for accessing digital library resources as described in "The Digital Library Integrated Task Environment" Technical Report SIDL-WP-1996-0049, Stanford Digital Libraries Project (Palo Alto, Calif.) 1996, by S. Cousins et al. DLITE explicitly reifies queries and search engines in order to provide users with direct access to dynamic collections. The goal of DLITE, however, is to provide a unified interface to a variety of search engines, rather than to create new models of searching and retrieval. So although queries in DLITE are independent of particular search engines, they are not integrated with collections as a uniform organizational mechanism.

Multivalent documents define documents as comprising multiple "layers" of distinct but intimately-related content. Small dynamically-loaded program objects, or "behaviors", activate the content and work in concert with each other and layers of content to support arbitrarily specialized document types. To quote from one of their papers, "A document management infrastructure built around a multivalent perspective can provide an extensible, networked system that supports incremental addition of content, incremental addition of interaction with the user and with other components, reuse of content across behaviors, reuse of behaviors across types of documents, and efficient use of network bandwidth."

Multivalent document behaviors (analogs to properties) extend and parse the content layers, each of which is expressed in some format. Behaviors are tasked with understanding the formats and adding functionality to the document based on this understanding. In many ways, the Multivalent document system is an attempt at creating an infrastructure that can deal with the document format problem by incrementally adding layers of "understanding" of various formats. In contrast, the present invention has an explicit goal of exploring and developing a set of properties that are independent of document format. While properties could be developed that could parse and understand content, it is expected that most will be concerned with underlying storage, replication, security, and ownership attributes of the documents. Included among the differences between the present invention and the Multivalent concepts are that, the Multivalent document system focuses on extensibility as a tool for content presentation and new content-based behaviors; the present invention focuses on extensible and incrementally-added properties as a user-visible notion to control document storage and management.

File systems known as the Andrew File System (AFS), Coda, and Ficus provide a uniform name space for accessing files that may be distributed and replicated across a number of servers. Some distributed file systems support clients that run on a variety of platforms. Some support disconnected file access through caching or replication. For example, Coda provides disconnected access through caching, while Ficus uses replication. Although the immediately described distributed file systems support document (or file) sharing, they have a problem in that a file's hierarchical pathname and its storage location and system behavior are deeply related. The place in the directory hierarchy where a document gets stored generally determines on which servers that file resides.

Distributed databases such as Oracle, SQL Server, Bayou, and Lotus Notes also support shared, uniform access to data and often provide replication. Like some distributed file systems, many of today's commercial databases provide support for disconnected operation and automatic conflict resolution. They also provide much better query facilities than file systems. However, distributed databases suffer the same problems as file systems in that the properties of the data, such as where it is replicated and how it is indexed and so on, are generally associated with the tables in which that data resides. Thus, these properties cannot be flexibly managed and updated. Also, the set of possible properties is not extensible.

A digital library system, known as the Documentum DocPage repository, creates a document space called a "DocBase." This repository stores a document as an object that encapsulates the document's content along with its attributes, including relationships, associated versions, renditions, formats, workflow characteristics, and security. These document objects can be infinitely combined and re-combined on demand to form dynamic configurations of document objects that can come from any source.

DocPage supports organization of documents via folder and cabinet metaphors, and allows searching over both document content and attributes. The system also provides check in/checkout-style version control, full version histories of documents, and annotations (each with its own attributes and security rules). The system also supports workflow-style features including notification of updates. DocBase uses a replicated infrastructure for document storage (see: http://www.documentum.com).

Among the key differences between Documentum DocPage and the present invention are: First, in the present system properties are exposed as a fundamental concept in the infrastructure. Further, the present system provides for a radically extensible document property infrastructure capable of supporting an aftermarket in document attributes. Documentum seems to be rather closed in comparison; the possible attributes a document can acquire are defined a priori by the system for a particular application environment and cannot be easily extended. Second, Documentum does not have the vision of universal access to the degree of the present invention which supports near-universal access to document meta-data, if not document content. In comparison, the scope of Documentum narrows to document access within a closed setting (a corporate intranet).

SUMMARY OF THE INVENTION

This invention allows the creation and use of documents that both have content and are collections of documents at the same time. The invention provides this functionality in either of two ways. One way is a document that takes a collection of other documents and can dynamically construct its own content derived from the content of those constituents. Correspondingly, a single piece of content can be made to appear simultaneously as both a single document with content and as a collection of documents, each representing a subcomponent of the larger content. In both cases, both the larger documents and the contained documents are full-fledged DMS-type documents which support indexing, tagging, properties membership in other collections, back-up and other DMS activities. It is noted that a document as an entity comprises identity properties and content. This definition permits document functionality including accessing properties, renaming, comparing for equality and assign of references.

Throughout this document the metaphor of atomic and molecular documents are used. In both cases the larger document which provides content is referred to as a molecular document, whereas the documents it contains are referred to as atomic documents. It is noted that both atomic and molecular documents are full-fledged DMS documents, each affording all of the benefits thereof.

It is also described that both molecular documents and their constituent atomic documents exist simultaneously, not requiring a mode where only one or the other is accessible at any given time.

This invention is implemented in the preferred embodiment by the described document management systems which provides for active properties and bit providers.

With attention to a more limited aspect of the present invention, a molecular document can have as its constituents atomic documents that are themselves constructed as virtual documents.

Conversely, with attention to another aspect of the present invention, a collection of atomic documents can be formed from a molecular document which is itself a virtual document.

With attention to still another aspect of the present invention, atomic documents of the molecular document, and the molecular document have attached properties whereby a user is given the ability to retrieve an entire molecular document or one of the atomic documents.

With attention to another aspect of the present invention, editing of the molecular document will alter the content of the individual atomic document and editing of an individual atomic document will alter the overall molecule document.

A principle advantage of the present invention is the creation of a molecular document comprised of atomic documents which are themselves full-fledged DMS-type documents.

Another advantage of the present invention is that molecular documents comprised of atomic documents are themselves full-fledged DMS-type documents.

A further advantage of the present invention is the provision of a specialized bit provider which is configured to retrieve content which is defined as another DMS-type document.

Still a further advantage of the present invention is increasing the ease with which a user may organize a document, wherein the user may review the overall document or sub-sections of the document may be presented as their own stand-alone document.

Still other advantages and benefits will become apparent to those skilled in the art upon reading and understanding of the following detailed description.

DESCRIPTION OF THE DRAWINGS

The invention may take physical form in certain parts and arrangement of parts, a preferred embodiment of which will be described in detail in this specification and illustrated in the accompanying drawings which form a part hereof, and wherein.

DETAILED DESCRIPTION OF THE PREFERRED EMBODIMENTS

Figure 1:
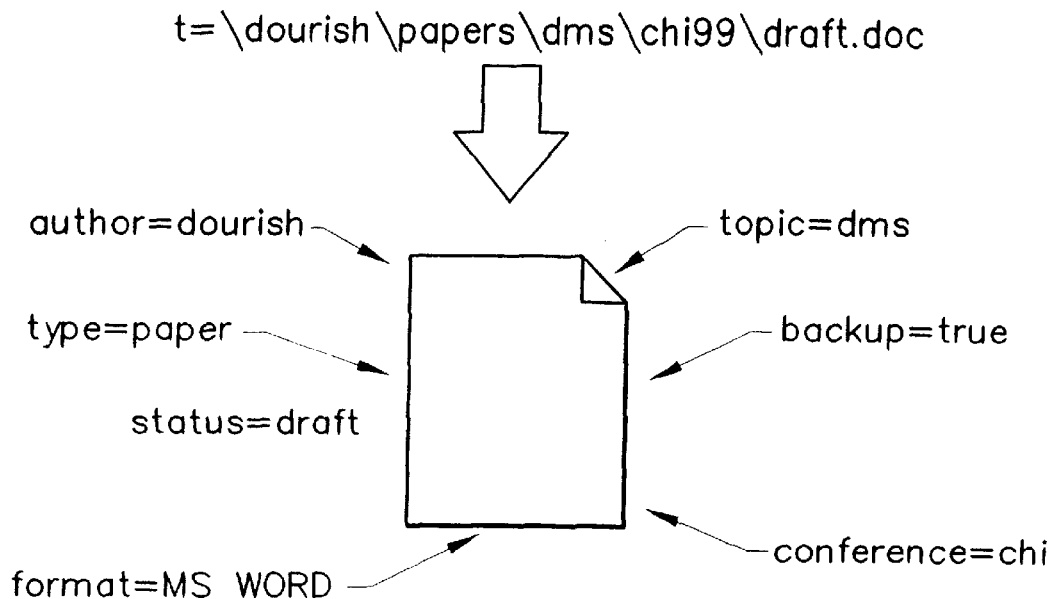
FIG. 1 shows a hierarchical storage mechanism compared to the concept of properties of the present invention.

Prior to discussing the present invention in greater detail, it is believed a glossary of terms used in the description would be beneficial. Therefore, the following definitions are set forth:

Action: The behavior part of a property.

Active Property: A property in which code allows the use of computational power to either alter the document or effect another change within the document management system.

Arbitrary: Ability to provide any property onto a document.

Base Document: Corresponds to the essential bits of a document. There is only one Base Document per document. It is responsible for determining a document's content and may contain properties of the document, and it is part of every principal's view of the document.

Base Properties: Inherent document properties that are associated with a Base Document.

Bit Provider: A special property of the base document. It provides the content for the document by offering read and write operations. It can also offer additional operations such as fetching various versions of the document, or the encrypted version of the content.

Browser: A user interface which allows a user to locate and organize documents.

Collection: A type of document that contains other documents as its content.

Combined Document: A document which includes members of a collection and content.

Content: This is the core information contained within a document, such as the words in a letter, or the body of an e-mail message.

Content Document: A document which has content.

Distributed: Capability of the system to control storage of documents in different systems (i.e., file systems, www, e-mail servers, etc.) in a manner invisible to a user. The system allows for documents located in multi-repositories to be provided to a principal without requiring the principal to have knowledge as to where any of the document's content is stored.

DMS: Document Management System

Document: This refers to a particular content and to any properties attached to the content. The content referred to may be a direct referral or an indirect referral. The smallest element of the DMS. There are four types of documents; Collection, Content Document, No-Content Document and Combined Document.

Document Handle: Corresponds to a particular view on a document, either the universal view, or that of one principal.

DocumentID: A unique identifier for each Base Document. A Reference Document inherits the DocumentID from its referent. Document identity is thus established via the connections between Reference Documents and Base Documents. Logically, a single document is a Base Document and any Reference Documents that refer to it.

Kernel: Manages all operations on a document. A principal may have more than one kernel.

Multi-Principal: Ability for multiple principals to have their own set of properties on a Base Document wherein the properties of each principal may be different.

Notification: Allows properties and external devices to find out about operations and events that occur elsewhere in DMS.

No Content Document: A document which contains only properties.

Off-the-Shelf Applications: Existing applications that use protocols and document storage mechanisms provided by currently operating systems.

Principal: A "User" of the system. Each person or thing that uses the document management system is a principal. A group of people can also be a principal. Principals are central because each property on a document can be associated with a principal. This allows different principals to have different perspectives on the same document.

Property: Some bit of information or behavior that can be attached to content. Adding properties to content does not change the content's identity. Properties are tags that can be placed on documents, each property has a name and a value (and optionally a set of methods that can be invoked).

Property Generator: Special case application to extract properties from the content of a document.

Reference Document: Corresponds to one principal's view of a document. It contains a reference to a Base Document (Reference Document A refers to Base Document B) and generally also contains additional properties. Properties added by a Reference Document belong only to that reference; for another principal to see these properties, it must explicitly request them. Thus, the view seen by a principal through his Reference Document is the document's content (through the Base Document), and a set of properties (both in the reference and on the Base Document). Even an owner of a Base Document can also have a Reference Document to that base, in which he places personal properties of the document that should not be considered an essential part of the document and placed in all other principal's view.

Space: The set of documents (base or references) owned by a principal.

Static Property: A name-value pair associated with the document. Unlike active properties, static properties have no behavior. Provides searchable meta-data information about a document.

Introduction

As discussed in the background of the invention, the structure that file systems provide for managing files becomes the structure by which users organize and interact with documents. However, documents and files are not the same thing. The present invention has as an immediate goal to separate management of properties related to the document or concerning the document from the management of the document content. Therefore, user-specific document properties are managed close to the document consumer or user of the document rather than where the document is stored. Separation of the management of user properties from the document content itself provides the ability to move control of document management from a closed file system concept to a user-based methodology.

FIG. 1 illustrates a distinction between hierarchical storage systems whose documents are organized in accordance with their location described by a hierarchical structure and the present invention where documents are organized according to their properties (e.g. author=dourish, type=paper, status=draft, etc.). This means documents will retain properties even when moved from one location to another, and that property assignment can have a fine granularity.

Figure 2:
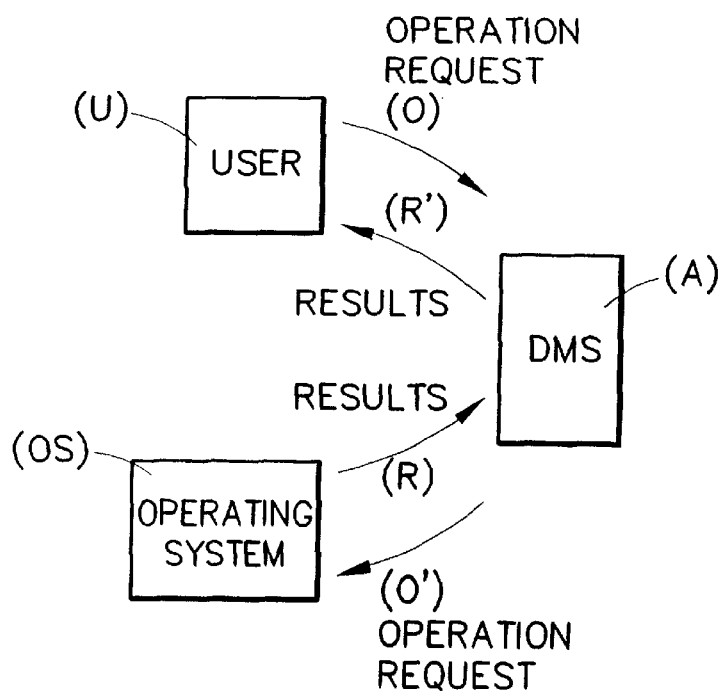
FIG. 2 is a block diagram of a document management system according to the present invention, interposed within a communication channel between a user and an operating system.

To integrate properties within the document management system of the present invention, the properties need to be presented within the content and/or property read/write path of a computer system, with the ability to both change the results of an operation as well as take other actions. The outline of the concept is described in FIG. 2, where once user (U) issues an operation request (O), prior to that operation being performed by operating system (OS), a call is made to document management system (DMS) A of the present invention, which allows DMS A to function so as to achieve the intended concepts of the present invention. This includes having DMS A interact with operating system (OS), through its own operation request (O'). Once operation request (O') is completed, the results are returned (R) to DMS A which in turn presents results (R') to user (U).

With these basic concepts having been presented, a more detailed discussion of the invention is set forth below.

Document Management System (DMS) Architecture

Figure 3:
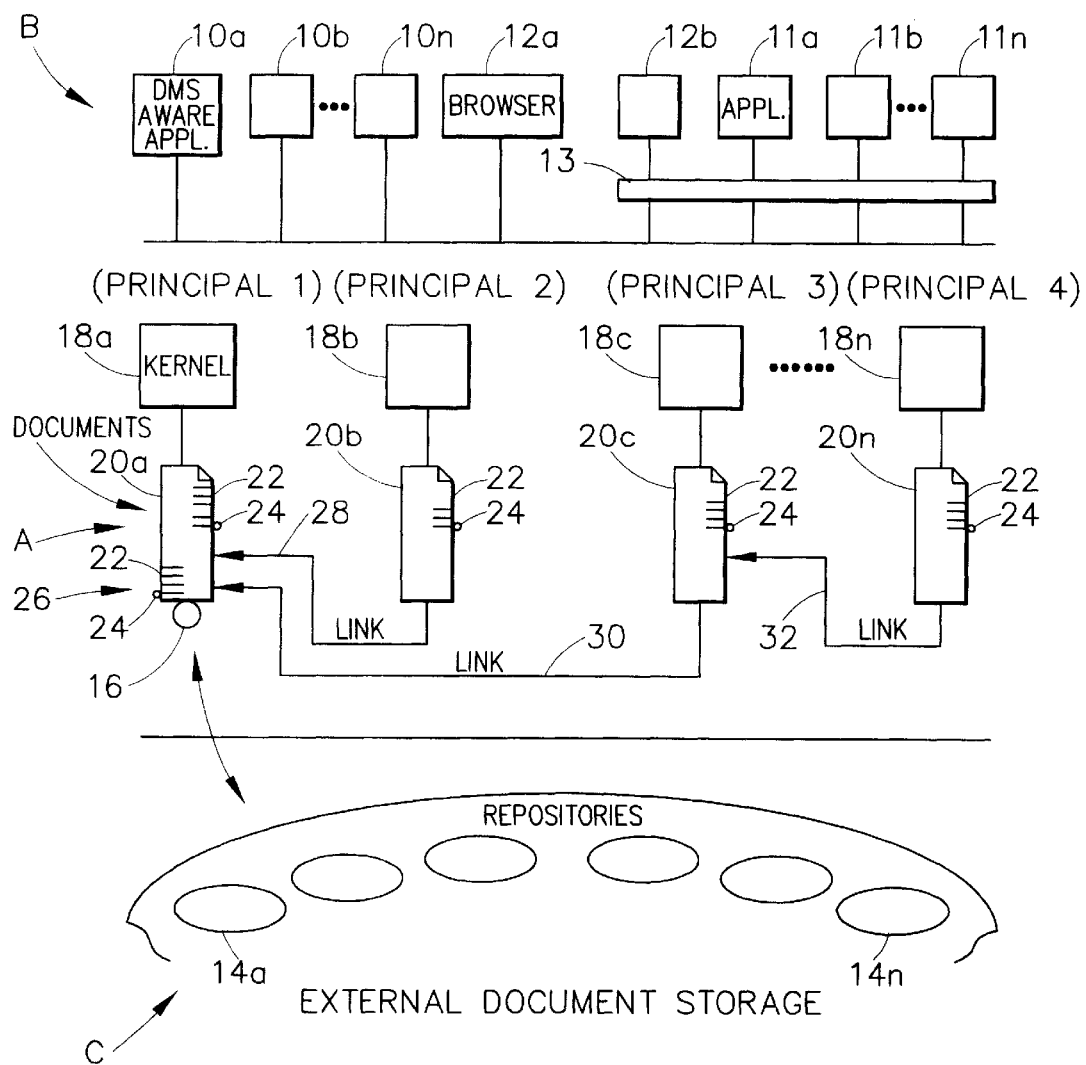
FIG. 3 is a representation of a document management system of the present invention implemented in a computer system which is DMS-aware.

FIG. 3 sets forth the architecture of a document management system (DMS) A of the present invention.

Document management system (DMS) A is shown connected for operation with front-end components B, and back-end components C. Front-end components B include applications 11a–11n, such as word processing applications, mail applications among others. Some of the applications are considered DMS aware 10a–10n which means these applications understand DMS protocols for storing, retrieving and otherwise interacting with DMS A. Other components are considered non-DMS aware 11a–11n. Browsers 12a (DMS aware) and 12b (non-DMS aware) are considered specialized forms of applications in order for the non-DMS aware applications 11a–11n and 12b to be able to communicate with DMS A, front-end translators or translation layer 13.

Similarly, back-end components C can include a plurality of repositories 14a–14n, where the content of documents are stored. Such repositories can include the hard disc of a principal's computer, a file system server, a web page, a dynamic real time data transmission source, as well as other data repositories. To retrieve data content from repositories 14a–14n, bit providers, such as bit provider 16, are used. These bit providers are provided with the capability to translate appropriate storage protocols.

Principals 1-n each have their own kernel 18a–18n for managing documents, such as documents 20a–20n. Documents 20a–20n are considered to be documents the corresponding principal 1-n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a real-time data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20b–20c. As will be discussed in greater detail below, in addition to base document 20a having static properties 22 and/or active properties 24, base document 20a will also carry base properties 26 which can be static properties 22 and/or active properties 24 (Static properties are shown with a—and active properties are shown with a -o).

Reference documents 20b–20c are configured to interact with base document 20a. Both base documents and reference documents can also hold static properties 22 and/or active properties 24. When principals 2,3 access base document 20a for the first time, corresponding reference documents 20b–20c are created under kernels 18b–18c, respectively. Reference documents 20b–20c store links 28 and 30 to unambiguously identify their base document 20a. In particular, in the present invention each base document is stored with a document ID which is a unique identifier for that document. When reference documents 20b–20c are created, they generate links to the specific document ID of their base document. Alternatively, if principal n references reference document 20c, reference document 20n is created with a link 32 to reference document 20c of Principal 3. By this link principal n will be able to view (i.e. its document handle) the public properties principal 3 has attached to its reference document 20c as well as the base properties and public reference properties of base document 20a. This illustrates the concept of chaining.

The above described architecture allows for sharing and transmission of documents between principals and provides the flexibility needed for organizing documents. With continuing attention to FIG. 3, it is to be noted at this point that while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. It is however, appreciated the invention will work with other communication configurations as well.

Using the described architecture, DMS A of the present invention does not require the principal to operate within a strict hierarchy such as in file or folder-type environments. Rather, properties 22,24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on reference document 20b. By placement of these properties, principal 2 can retrieve the base document in a manner different than that envisioned by principal 1.

Further, by interacting with browser 12a or 12b, a principal may run a query requesting all documents having a selected property. Specifically, a user may run query language requests over existing properties.

Therefore, a point of the present invention is that DMS A manages a document space where properties are attached by different principals such that actions occur which are appropriate for a particular principal, and are not necessarily equivalent to the organizational structure of the original author of a document or even to other principals.

Another noted aspect of the present invention is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e. principal 2), since properties are maintained with the principal who put the properties onto a document.

Bit Providers

As previously noted, an aspect of the present invention is the separation of a document's properties from a document's content, and that a user is able to retrieve the content of a document existing at a location separate from the properties. The DMS A architecture used to implement this retrieval is illustrated in FIG. 3. Particularly, bit provider 16 acts as a mechanism to retrieve content from external storage repositories 14a–14n. Bit providers are also provided with the capability to translate appropriate protocols when necessary. The content which a bit provider is instructed to retrieve could be found in a World-Wide-Web page, a file system, e-mail server, or even dynamic data such as an electronic video feed, etc. Once content is retrieved, it is supplied to the requesting document. Use of bit providers allows DMS A to manage documents completely independently of how the documents are stored, i.e. where the content of base document 20a exists. Thus, a user or principal does not need to worry about where the bits of the content are actually existing. Rather, once within DMS A, a user or principal will simply view the content as a DMS A document and will perform management operations exactly the same way regardless of where the content is actually stored. This allows a single document management layer to run over a large variety of storage systems and storage architectures.

Bit providers work in terms of active properties. DMS A assigns responsibility for providing the document content to an active "bit provider" property. Code associated with the property handles all requests to read or write the document's content. This gives the property the ability to undertake additional kinds of activities. Among these are caching, meaning it can make a local copy of content that is otherwise stored remotely. A further activity is access control, where the bit provider is informed of the requester of each request, and can deny the request based on access control criteria. A further activity is configuration management. Particularly, since the bit provider mediates all requests for the document content, you can store the bits (if any) at any accessible place. Part of its decision of where to store them can be in response to configuration management information recorded in properties. Yet another activity of the bit provider is collections—specifically collections of documents—. For collections, the "content" is actually a collection of other documents, and a bit provider manages the record of that collection. Another feature of bit providers is that they are replaceable, i.e. a particular base document may change from one bit provider, to another having different capabilities.

Figure 4:
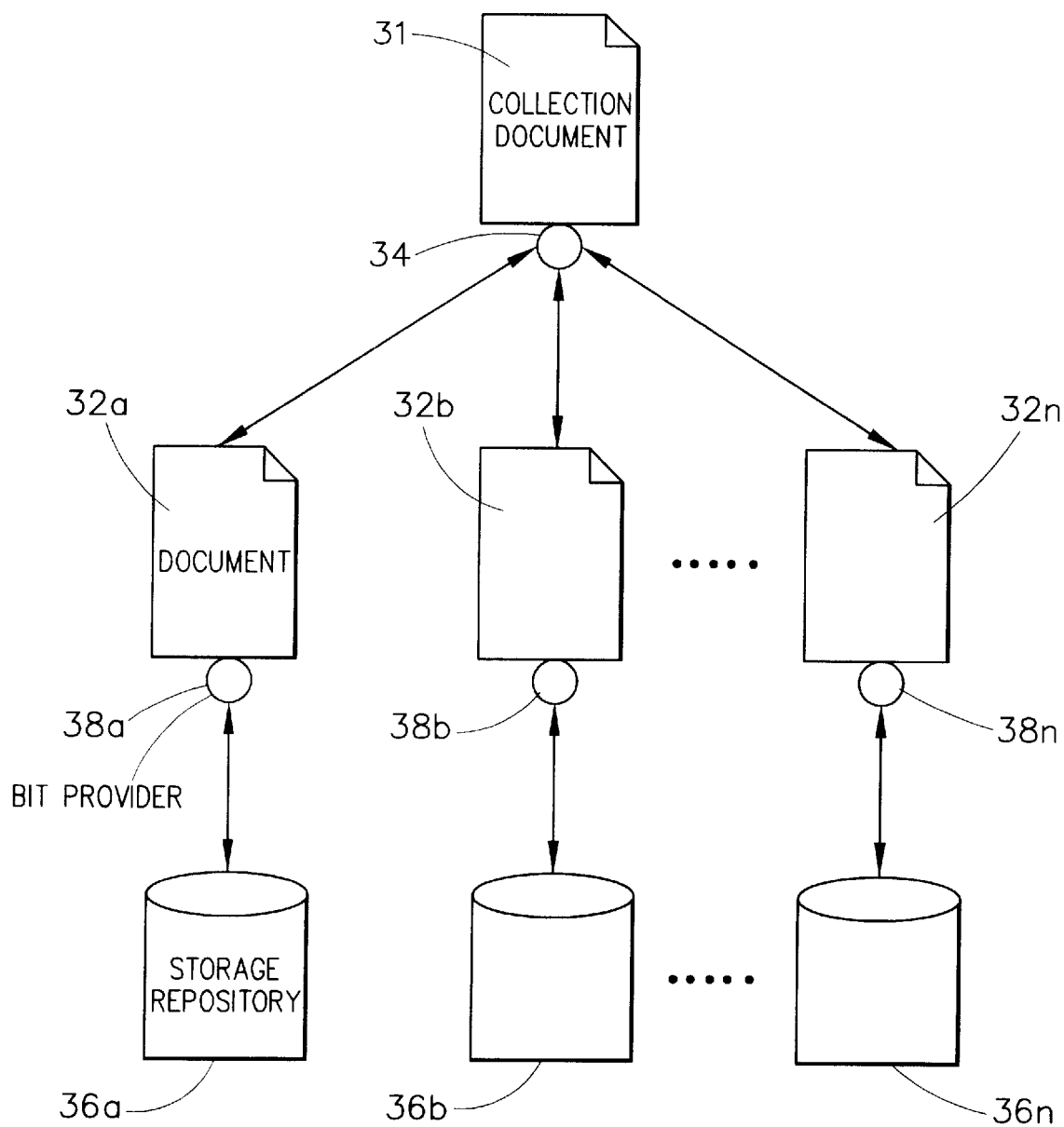
FIG. 4 depicts a document collection.

By having a unified manner of receiving content into DMS A, flexibility of document management, not previously obtainable, is achieved. For example, in existing document management mechanisms, collections are represented in the same back-end repository as the files those collections contain. However, in DMS A, the representation of collections is separated from the representation of files. While file content can reside on a multiplicity of back-and repositories, collections exist solely as light-weight properties, and are stored close to the user of the documents. This concept is illustrated in FIG. 4 which shows collection document 31 comprised of documents 32a–32n, which were retrieved by its bit provider 34. The content of collection document 31 is therefore the properties of documents 32a–32n which themselves have content in any of a number of different storage repositories 36a–36n retrievable by their bit providers 38a–38n. By this technique, collections are made "universal", that is, they can contain any type of content (web pages, normal files, mail messages, news postings, stock quotes, etc.), and they can be created by users even when no collection existed in the space created by the document producers.

On the other hand, DMS A collections are unique in that they can contain documents that reside in any back-end storage repository. This ability is a consequence of two facets of the DMS A architecture. First, DMS A can manage documents independently of the repository used to maintain the content of those documents. Second, DMS A collections are not made manifest in any back-end repository. They exist purely as properties on systems belonging to the document user.

The implications of this architecture are two-fold. First, users can create collections where none existed before. For example, a user can create a collection of web documents, for example, even if the provider of those documents has never implemented WebDAV. Second, because DMS A documents reference their content through a replaceable bit provider, collections can contain documents whose content exist in multiple back-end repositories. Therefore users can create an "important" collection containing not only files, but also web pages, mail messages, calendar appointments, etc.

Virtual Documents

Figure 5:
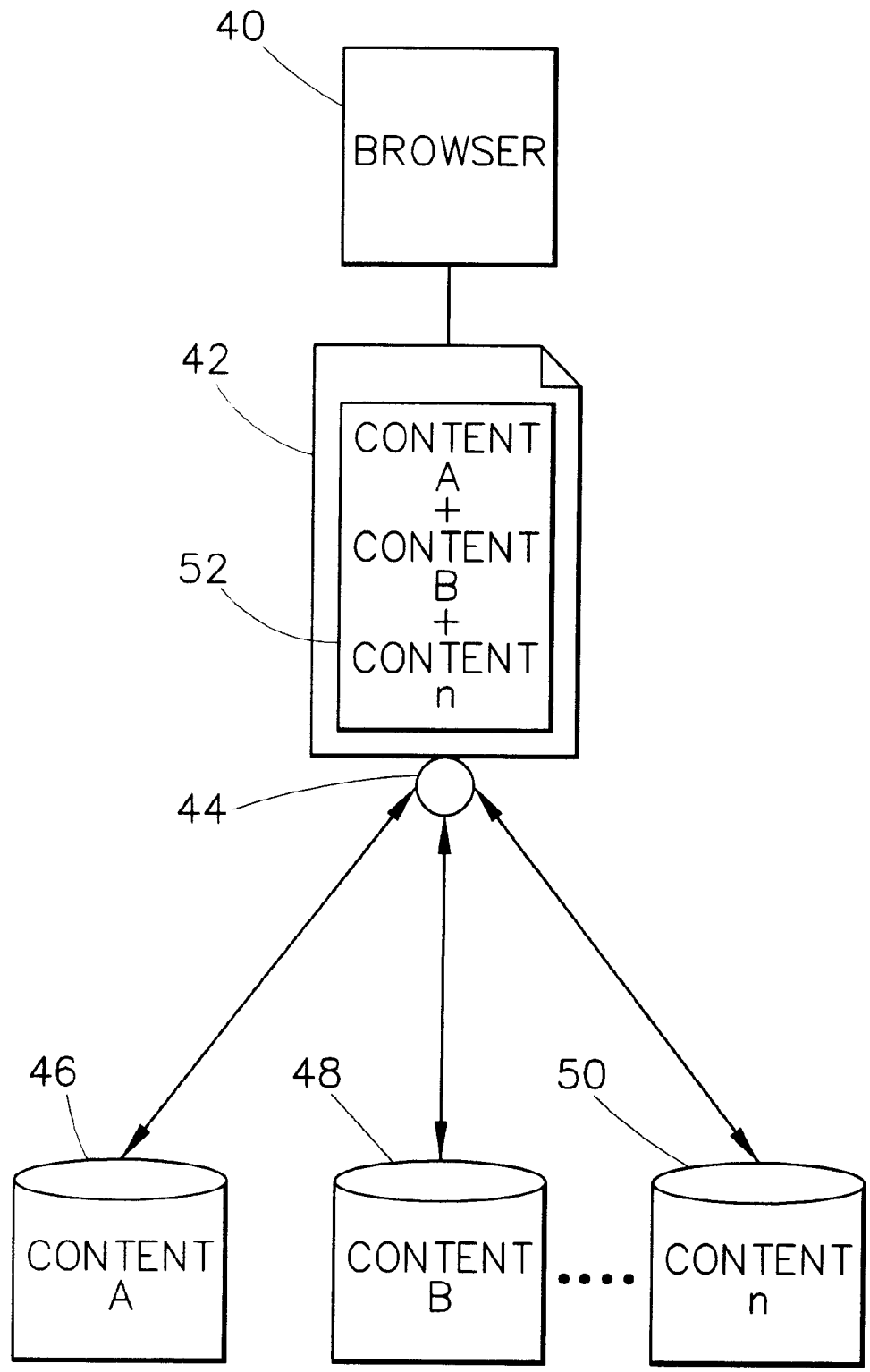
FIG. 5 illustrates a virtual document wherein the content is retrieved from more than one storage repository.

The generation of virtual documents is based on a recognition that a one-to-one correspondence between a document and where the content of the document is stored is not required in DMS A. Specifically, by using the bit provider to retrieve document content such that the document does not know where the document content is stored, content for a single document can be dispersed among numerous storage repositories. An example of the foregoing is illustrated in connection with FIG. 5 wherein a principal, through browser 40 issues a request to retrieve the content for a document 42. Document 42 then instructs bit provider 44 to retrieve the content of document 42. When bit provider 44 undertakes the task of retrieving the content of document 42, it determines the content is stored among a variety of storage repositories. Therefore, bit provider 44 is required to retrieve content of from each of the separate repositories (repository (1), 46, repository(2), 48, and repository(n), 50). Bit provider 44 then combines the content from the separate repositories and delivers the combined content 52 to document 42. Thus, the single document viewed by the principal is in actuality distinct content retrieved from separate repositories. From the preceding, the fact that DMS A does not require a one-to-one correspondence between document content and where that content is stored, allows content for a single document to be stored across a plurality of data storage repositories.

Figure 6:
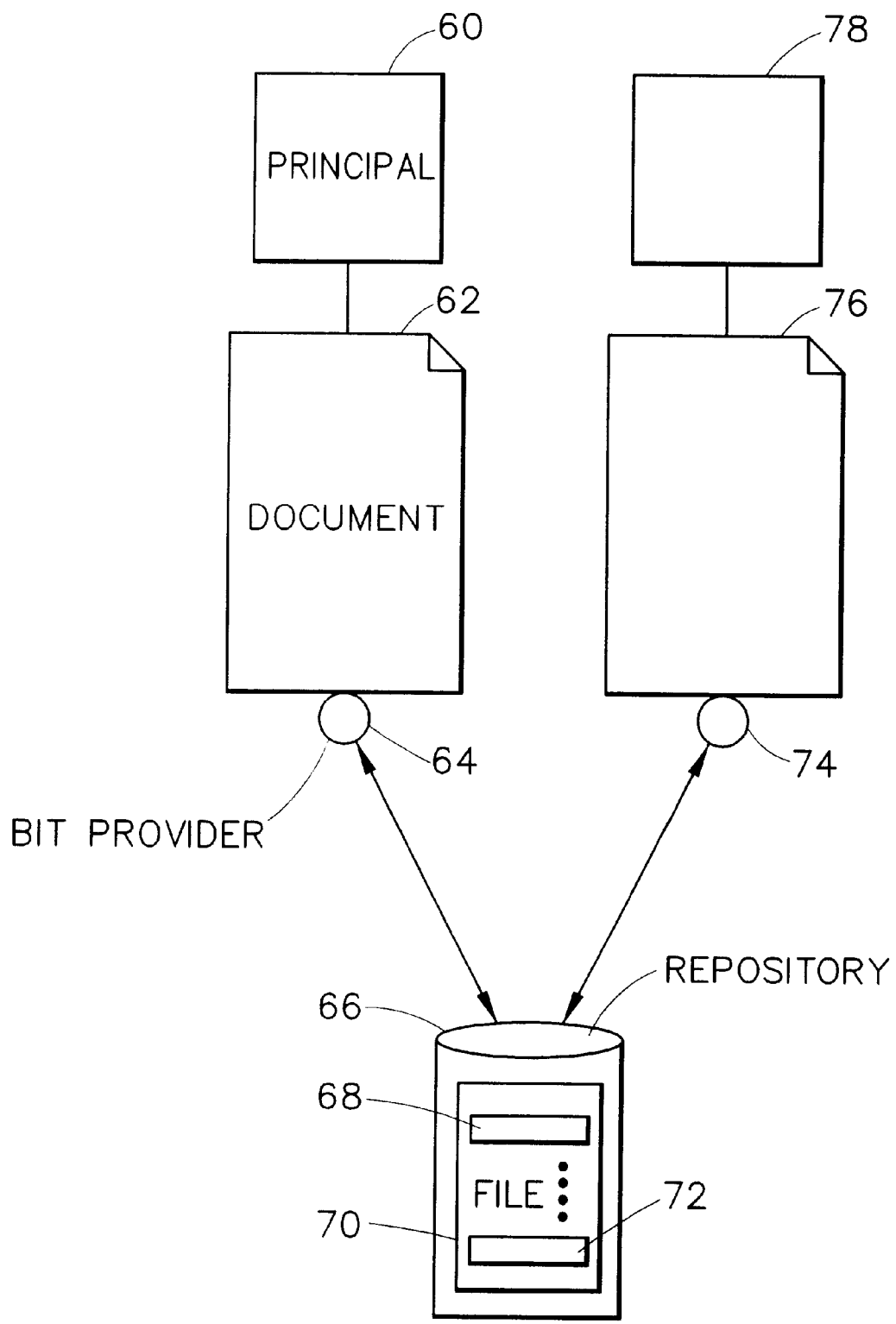
FIG. 6 depicts a virtual document wherein the contents of the document are smaller than a single file on a storage repository.

In addition to the foregoing scenario, a virtual document may also be a document whose content is only a portion of a larger file. For example, as shown in FIG. 6, when a principal 60 issues a request for content of a document 62, the bit provider 64 attached to that document is requested to retrieve the content for the document. The bit provider looks-up the address for the content and determines that that content exists within a particular repository 66. However, unlike the previous example, where the requested document's content included all the data such as a file, in the present embodiment the desired content is only a sub-portion 68 of a file 70. The sub-portion 68 of the total content of file 70 is retrieved by bit provider 64 and is delivered to the document 62. From that same file 70, sub-content 72 could be retrieved by a bit provider 74 carried on a document 76 (retrieved due to a request from another principal 78). In both cases, from the perspective of each principal, the document content being viewed is considered to be a complete document.

Figure 7:
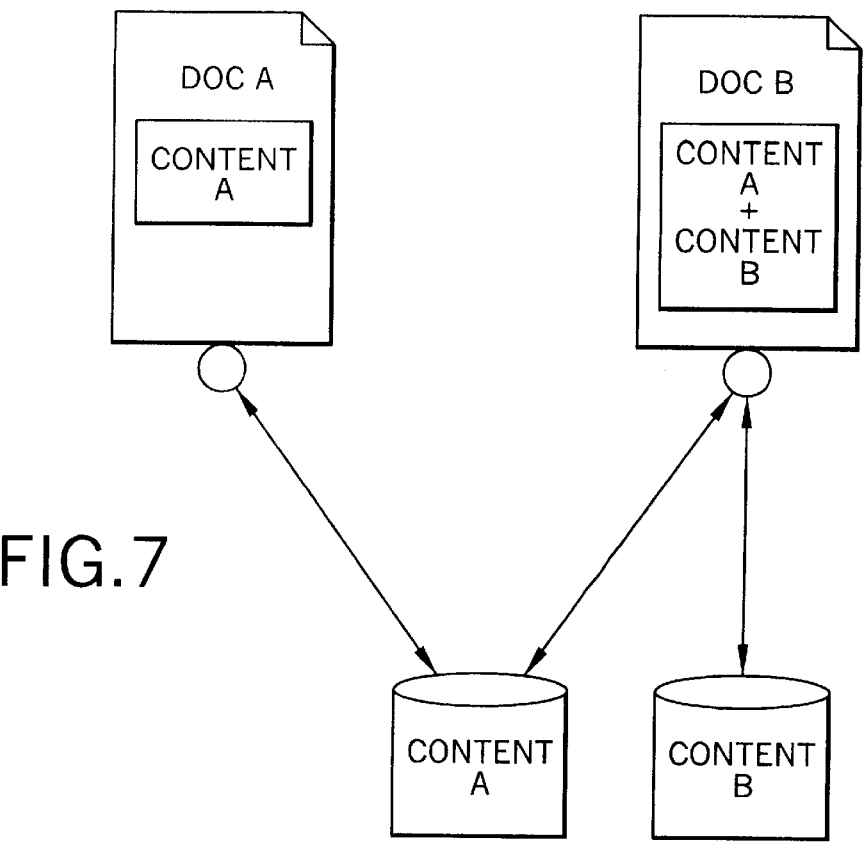
FIG. 7 depicts that content on a repository which for one document is the complete document, can be a portion of another document.

Turning attention to FIG. 7, it is illustrated that a single piece of content (CONTENT A) may be considered both the entire content of a single document (DOC A) or a sub-portion of content for another document (DOC B), i.e., where the other document (DOC B) includes more than a single location for its content (CONTENT A and CONTENT B, from separate repositories).

Figure 8:
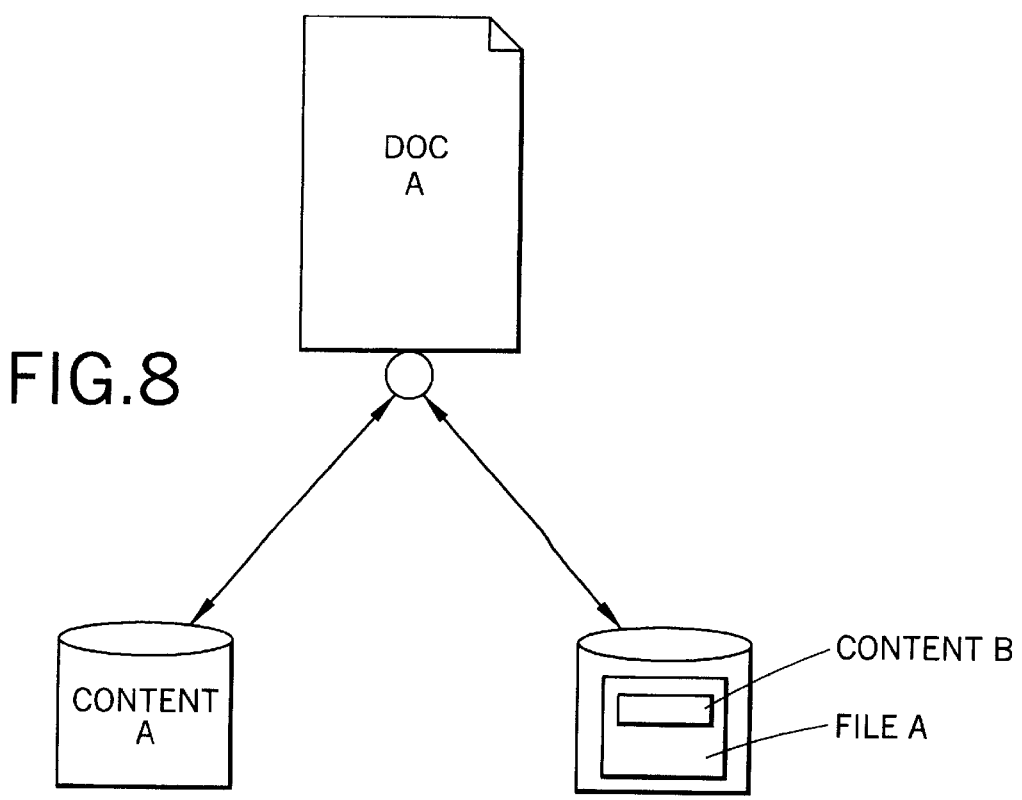
FIG. 8 illustrates that a document can be combined with content from more than a single repository wherein one of the portions of the content are smaller than a complete file on a repository.

Further, with attention to FIG. 8, it is also noted that when content for a document (DOC A) is found on more than a single repository, a sub-portion of that content may be a complete file (CONTENT A), while the additional content on the other repository may be a sub-portion (CONTENT B) of a larger file (FILE A).

Thus, it is to be appreciated that virtual documents are directed to a notion regarding the relationship between documents in DMS A and the files or other repositories or on-line information sources outside of DMS A that provide the content. Since the present invention has separated the content of a document from that document's properties, there is no longer a need for a one-to-one correlation between a document and the contents which make up that document. It is to be understood that virtual documents are not required to be generated from a back-end storage repository, but rather may also be configured using dynamic on-line information

Atomic and Molecular Documents

The concepts of bit providers, collections and virtual documents implemented in the DMS environment of the present invention have been disclosed. The present concept builds on and is used in conjunction with these concepts. The terms atomic document and molecular document are used in the following description for discussion purposes, there is no intention that use of these terms limits the concepts disclosed.

Figure 9A:
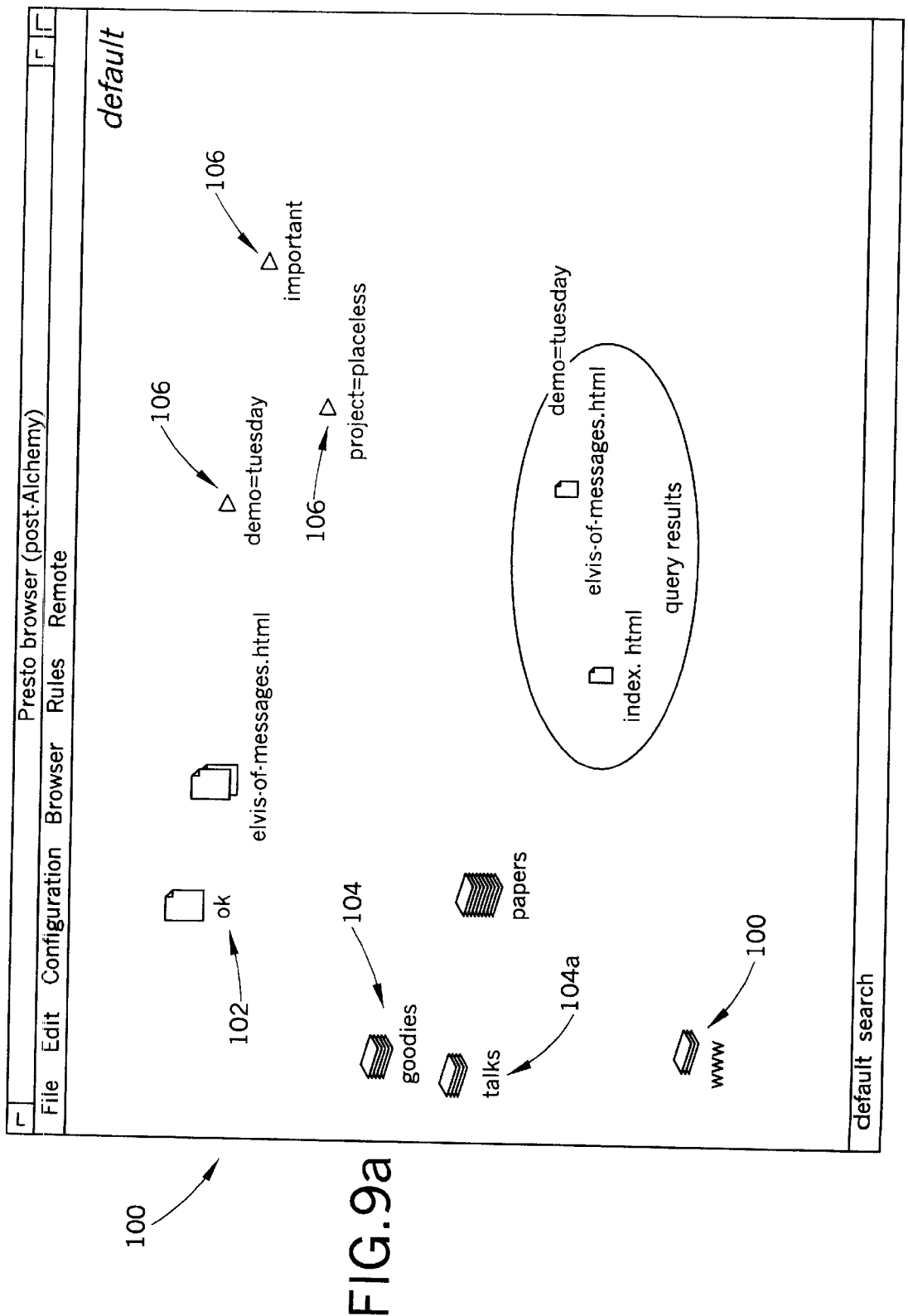
FIGS. 9a and 9b depict a display screen representing operation of the present document management system.
Figure 9B:
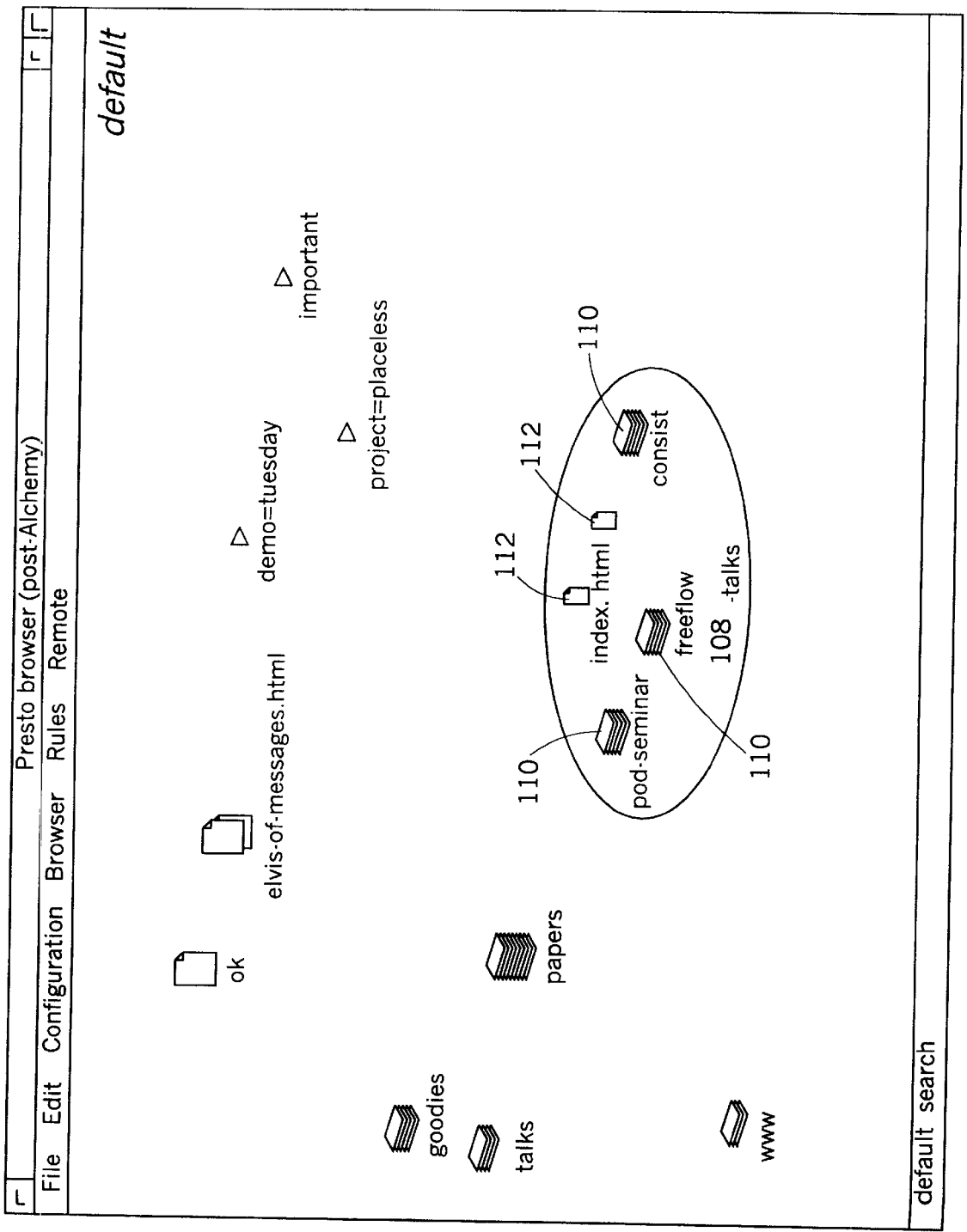

FIG. 9a is a display screen 100 on which is displayed the output from a browser used in accordance with the teachings of the present invention. Display screen 100 depicts representations of individual documents 102, collections 104, (including collection "talks" 104a) and properties 106. As shown in FIG. 9b, when the collection "talks" 104a is presented as an open collection 108, the elements of that collection are depicted. Within this collection are other collections 110, as well as individual documents 112. However, it can be seen that open collection 108 does not display any content for these depictions. Rather, in order to see the content of a document (e.g. text.doc or index.html) 112, it is necessary to retrieve the individual document. Thus, while collections bring together separate documents, including other collections, in existing systems collections do not provide a composite content formed from their constituent members.

Figure 10:
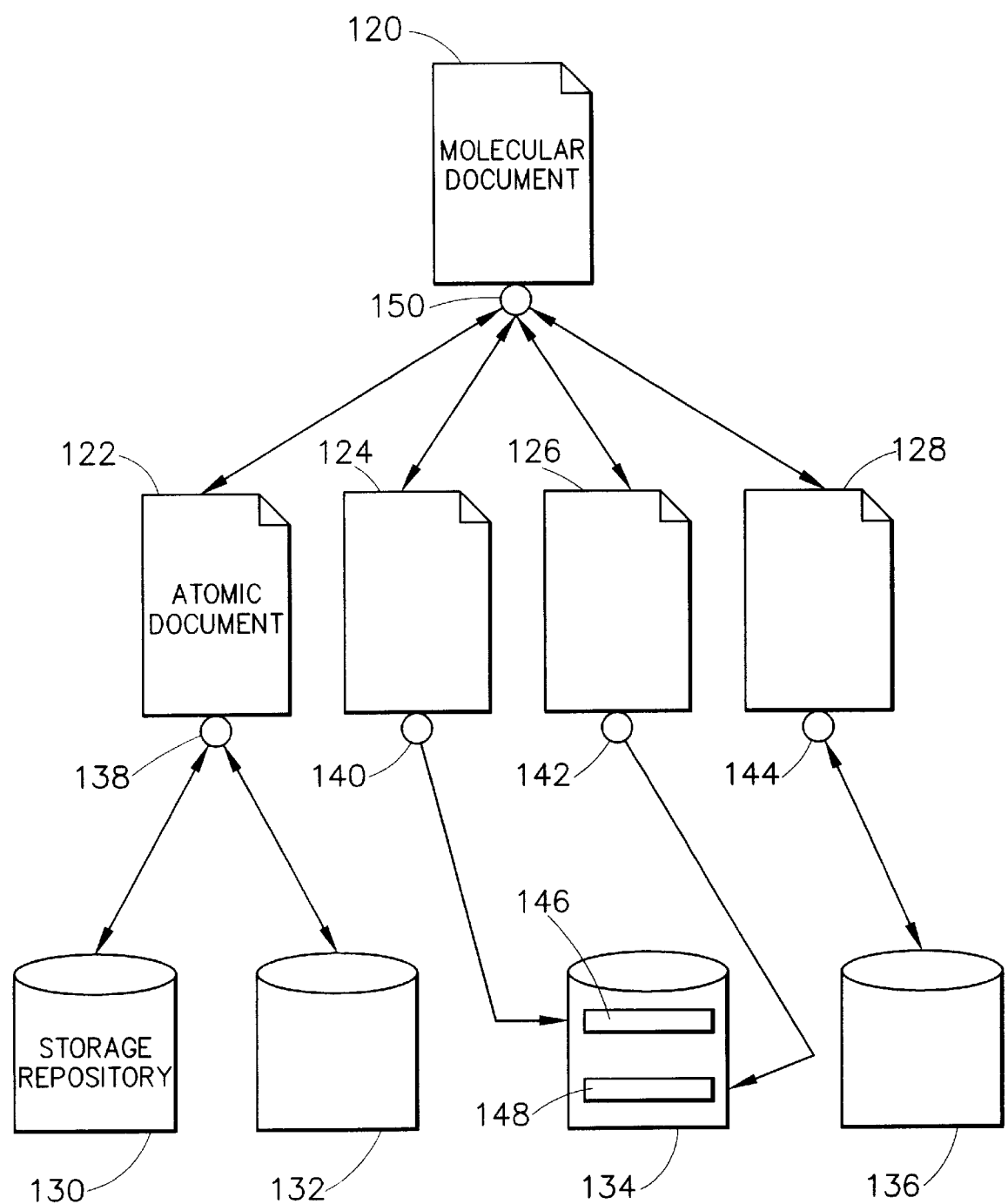
FIG. 10 is a block diagram of a document according to the present invention.

On the other hand, and as shown with more particularity in FIG. 10, molecular documents such as document 120, are configured to include members, i.e. atomic documents 122–128 which have attached properties. The content of the members are stored in storage repositories 130–136. In the present embodiment, a user is unaware that the requested document is a molecular document. Particularly, due to the concepts of DMS A, such information is not required to be provided to a user.

As a point of interest, atomic documents 122–128 which receive their content from storage repositories 130–136, through respective bit providers 138–144 are described as virtual documents. In particular, document 122 receives its content from separate repositories 130 and 132. In this embodiment of a virtual document, bit provider 138 is configured to retrieve the content from these separate repositories and combine the content for document 122. Similarly, documents 124 and 126 receive content from the same repository 134, within the same file, but only sub-contents 146 and 148 are retrieved by the respective bit providers 140 and 142. Lastly, document 128 receives its content from repository 136 which is retrieved by bit provider 144 (this is not a virtual document). It is to be understood that while atomic documents 122–126 are virtual documents, the present invention is not dependent upon its use with virtual documents. As documents 122–128 each have bit providers, they are to be considered base documents. Similarly, as document 120 has a bit provider 150 used to retrieve documents 122–128 it may also be considered a base document.

In the present embodiment, atomic documents 122–128 are stand-alone DMS A-type documents, supporting indexing, tagging, collection membership, properties, backup, etc. Thus, both the atomic documents 122–128 and molecular document 120 are full-fledged DMS A documents. Molecular document 120, however, acts as a container, as it contains the atomic documents. In addition to being a container, molecular document 120 can also provide content. Particularly, bit provider 150 of molecular document 120 is configured to retrieve the content and properties associated with atomic documents 122 128. Thus, when molecular document 120 is requested, what is actually being requested are atomic documents 122–128, which in turn cause requests to be issued to their attached bit providers 138–142, to retrieve their content.

Figure 11:
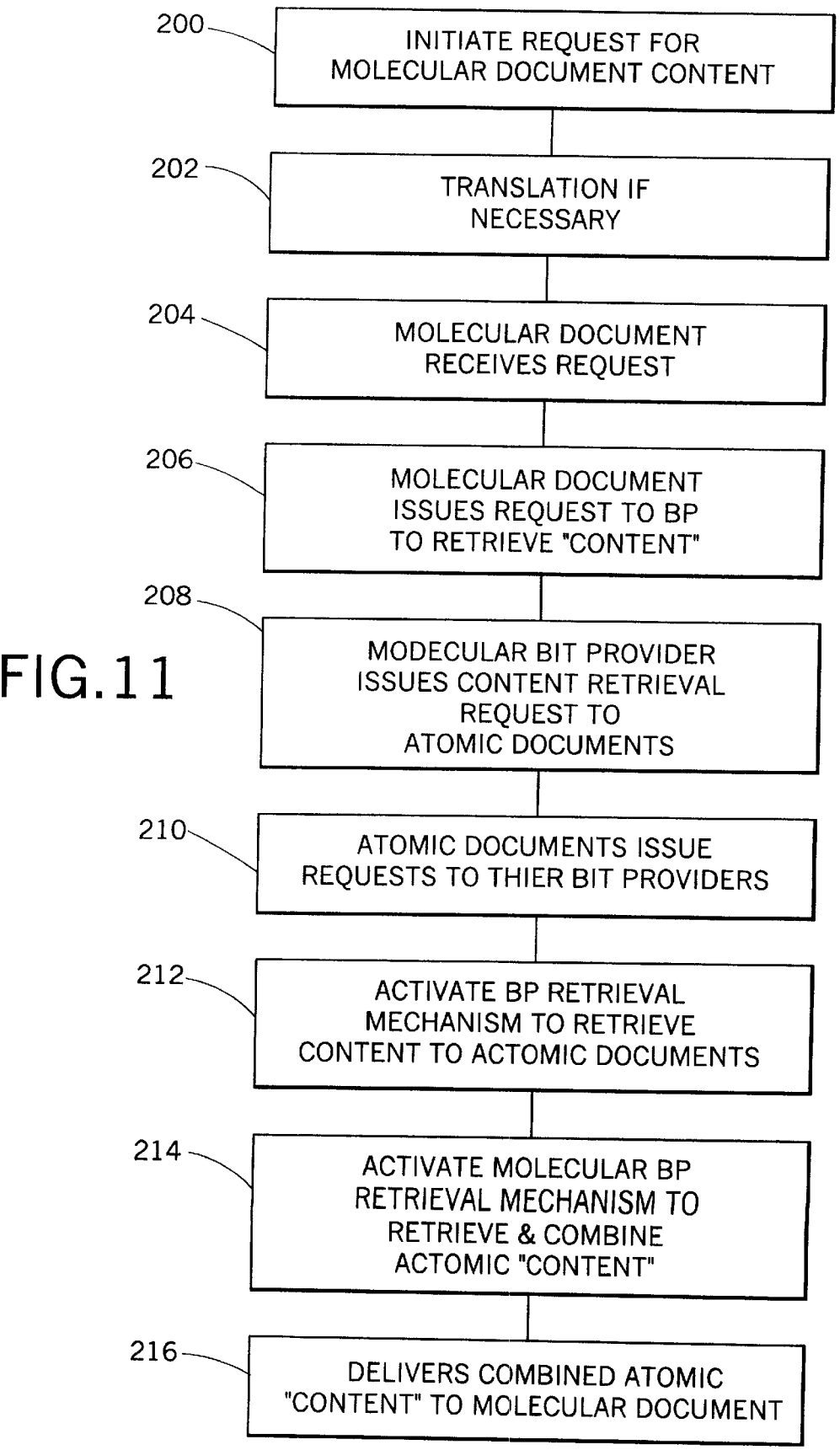
FIG. 11 is a flowchart for the configuration of a molecular document according to the present invention.

Turning attention more particularly to FIG. 11, a flow chart showing the operation described above is set forth. A user initiates a request through an input device (such as a browser) 200 to retrieve the contents of the molecular document. If it is determined necessary, a protocol translation is initiated to translates the request to an appropriate protocol 202. The request is then received by molecular document 204. The molecular document will then issue a request to its bit provider, attached to the atomic document, which will use a look-up table or other device to obtain the addresses of the "content" to be retrieved 206. In the present embodiment, these "contents" are other DMS A documents. Each of the atomic documents which are to be retrieved in turn receive a content retrieval request (translated if necessary) from the bit provider of the molecular document 208. Next, each of the atomic documents issue a content retrieval request to their bit providers 210. The bit providers of the atomic documents then activate a retrieval mechanism to retrieve their content 212. If the content is from a virtual document the content will, if necessary, be combined. Once the content is delivered to the atomic documents, the molecular bit provider retrieves and combines the content of each of the atomic documents 214. The retrieved, combined "content" (i.e. the atomic documents) is then delivered to the molecular document 216.

Figure 12:
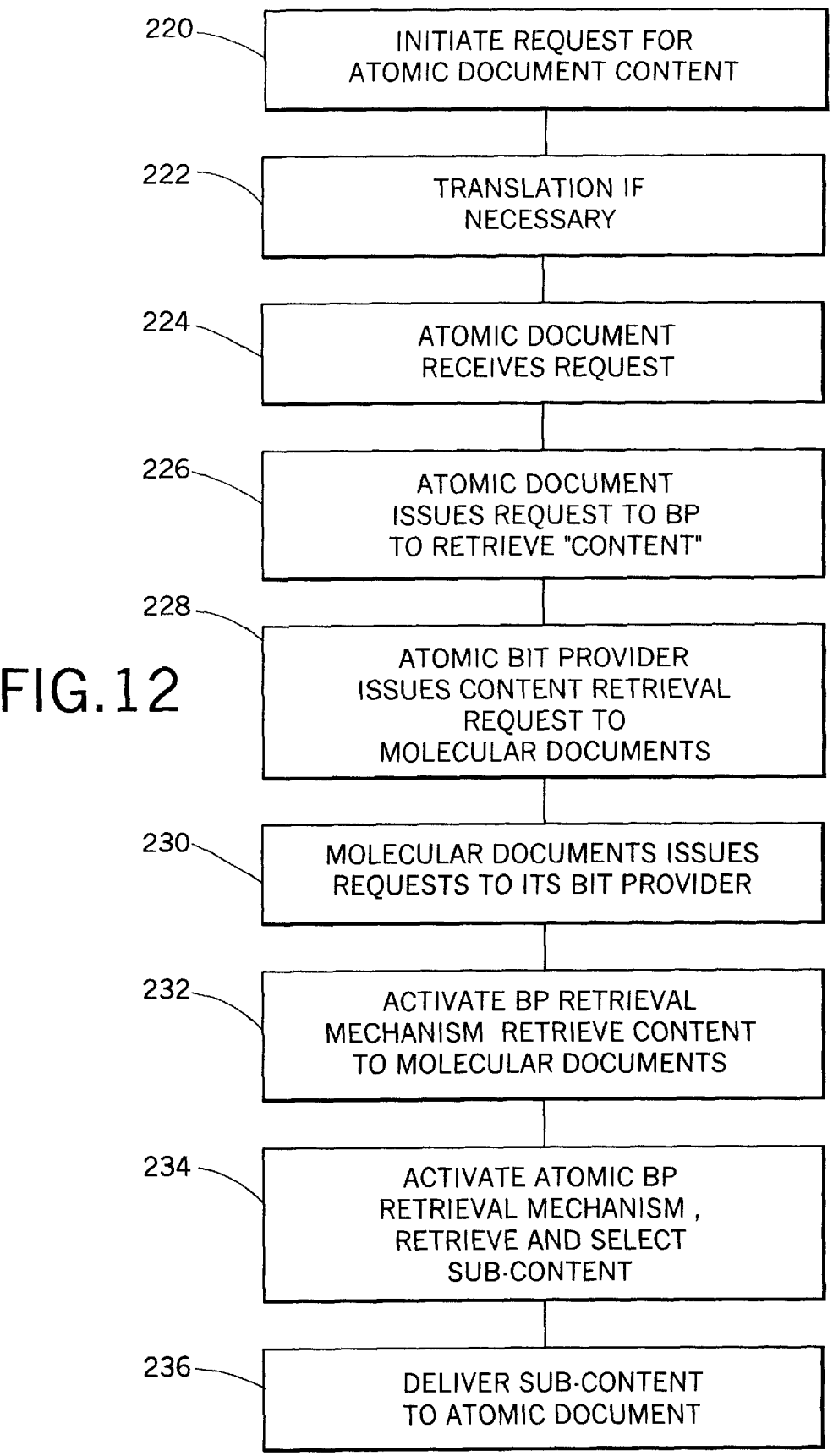
FIG. 12 is a flowchart for the configuration of an atomic document according to the present invention.

FIG. 12 is a flow chart illustrating the operation with regard to a generation of atomic documents. In step 220 the user initiates a request for atomic document content. If a translation is necessary the translation is undertaken 222, thereafter, the atomic document receives the request made by an operator. Once the request is received in step 224, the atomic document in turn issues a request to its bit provider to retrieve the requested content 226. Thereafter, the atomic bit provider issues a content retrieval request to the molecular document 228. The molecular document in turn issues a request to its bit provider in order to retrieve the desired contents 230. The molecular bit provider then activities its retrieval mechanism to retrieve the content to the molecular document 232. The atomic bit provider then activates its retrieval mechanism to retrieve and select the sub-content desired by the initial request 224. Once the bit provider has retrieved the sub-content selected by the request, it delivers the sub-content to the requesting atomic document 236.

As an explanation of the usefulness of atomic and molecular documents, an example will be used of an electronic book having multiple chapters. Using atomic and molecular documents, a user can view the book as one document, i.e. similar to a person reading a hard copy of the book. Therefore, the book is viewed as a single document. However there are other times when a user may wish to view only one chapter of the book. Using the present invention, in addition to attaching properties to the book as a whole (molecular document), it is also possible to attach properties to each of the individual chapters (atomic document). This allows a user to treat the book as a whole document at certain times, thereby putting properties on it, and at other times to treat the chapters as individual documents having properties. This allowing retrieval both on the molecular document level (i.e. as a book) and as the atomic documents themselves (i.e. documents 122–128 of FIG. 10).

Continuing with the book analogy, if such a document was to be stored in an existing file system, then the user would have to decide whether to store each chapter in an individual file in which case it becomes difficult to read as a single book. Particularly, it would be necessary to retrieve each individual file on a continuing basis when that particular chapter was required. So for example, if you wish to skip from chapter 2 to chapter 5, it would be necessary to re-issue a command to retrieve chapter 5. However, in the present invention it is simply a matter of paging forward within the same document. While alternatively, if the decision in existing file systems was to store the book as a single file, then there is no mechanism to pull out individual chapters in a rapid, easy manner, i.e. with a single instruction. Therefore, the present invention allows a user to store the "book" as either a whole book or individual chapters. Both the chapters and the book are, in fact, documents that a user can see as documents independent of how they are actually stored in the underlying system. Whether the bit provider may, in fact, store the chapters in separate files or store them in one file is irrelevant to the user. In this scenario it is noted that the application used for viewing and editing the book or chapters need have no understanding of their interdependencies; it behaves as if it is operating on independent documents.

Another feature due to the use of an atomic document is that when a user edits one of the documents which are an atom of the atomic document (i.e. a chapter), it will change the molecular document (i.e. the book).

As previously discussed, a bit provider is a piece of code that is developed for the retrieval and storage of documents externally of the DMS A. The bit providers can therefore be specialized bit providers such as a "book bit provider" which has the functionality to determine between chapters, etc. Thus, the bit providers are constructed of encapsulated code which can be directed to specific tasks.

From the above, it is shown that the generation of molecular documents occur entirely within DMS A. A distinction to be noted between virtual documents and molecular documents, is that the atomic documents which form the molecular document can themselves have attached properties, and function as independent documents. On the other hand, in a virtual document, the content, i.e. files, etc. do not have properties attached and are not DMS-type documents. Further, this content for virtual documents are from outside the DMS A structure, whereas the "content" of the molecular documents are within DMS A.

The invention has been described with reference to the preferred embodiment. Obviously, modifications and alterations will occur to others upon reading and understanding this specification. It is intended to include all such modifications and alterations in so far as they come within the scope of the appended claims or the equivalents thereof.

Having thus described the present invention, We now claim:

1. A document of a document management system comprising:

a plurality of individual full fledged documents of the document management system, the plurality of individual full fledged documents including a mechanism wherein they are combined on a non-permanent basis as a single full fledged document of the document management system, and wherein said mechanism is implemented as active properties operate in a non-hierarchical structure and attached to each of the individual full fledged documents, said active properties possessing computational power of at least one of altering of documents, notification of other documents, notification of external sources and causing said other documents and/or external sources to perform a function.

2. The document according to claim 1, wherein a user of the document management system uses an application interacting with the document management system to view the first full fledged document, and the application being used is lacking any information as to interdependencies between the plurality of individual full fledged documents, whereby the application interacts as if it is operating with solely independent documents.

3. In a document management system, a method of generating a molecular document comprising:

separating content of a document from properties used to describe the document;

using bit providers to retrieve content for a particular document in accordance with a request for content based on at least on; selected property of the properties, the document being unaware of from where the content was retrieved, and a one-to-one correspondence between content and a document does not need to exist;

issuing a request for a first document;

receiving the request by the first document;

sending a request from the first document to a first bit provider to retrieve content of the first document;

determining addresses of the content of the first documents wherein the addresses are for other documents of the document management system;

retrieving the content of the other documents of the document management systems;

retrieving, by the first bit provider, the other documents as the content of the first document; and delivering the other documents to the first document as its contents to generate the molecular document which includes active properties, and wherein said active properties possess computational power of at least one of altering of documents, notification of other documents, notification of external sources and causing said other documents and/or external sources to perform a function.

4. The method according to claim 3 further comprising:

issuing a request by an application of the document management system for the molecular document;

receiving the request by the molecular document;

sending a request from the molecular document to a molecular bit provider attached to the molecular document to retrieve content of the molecular document;

sending a request from the molecular bit provider to a plurality of documents of the document management system;

receiving the request from the molecular bit provider by the plurality of documents;

issuing a request, for each of the documents receiving the molecular bit provider request, to a corresponding bit provider attached to the document, to retrieve the content for that document;

determining, by the corresponding bit provider, the addresses of the content of the corresponding document;

retrieving, by the corresponding bit provider, the content of the corresponding document;

delivering , by the corresponding bit provider, the retrieved content to the corresponding appropriate document;

retrieving, by the molecular bit provider, the corresponding documents containing the retrieved content; and delivering the retrieved corresponding documents to the molecular document.

5. The method according to claim 3 wherein the first provider is a specialized bit provider capable of recognizing content as being a document having attached properties.

6. The method according to claim 3 further including:

editing the molecular document, wherein the atomic document having the edited content has its content altered.

7. The method according to claim 3 further including:

editing one of the atomic documents, wherein the molecular document is altered.

8. The method according to claim 3 wherein at least one of the atomic documents is a virtual document.

9. The method according to claim 8 wherein the virtual document is comprised of content from more than a single storage repository.

10. The method according to claim 8 wherein the virtual document is comprised of content less than an entire file of a storage repository.

11. In a document management system, a method of generating an atomic document comprising:

separating content of a document from properties used to describe the document;

using bit providers to retrieve content for a particular document in accordance with a request for content based on at least one selected property of the properties, the document being unaware of from where the content was retrieved, and a one-to-one correspondence between content and a document does not need to exist;

issuing a request for a first document;

receiving the request by the first document;

sending a request from the first document to a first bit provider to retrieve content of the first document;

determining addresses of the content of the first document, wherein the addresses are for sub-content of another document in the document management system;

retrieving the sud-content of the other document of the document management system;

retrieving, by the first bit provider the other document as the sub-content of the first document; and delivering the other document to the first document as its contents to generate the atomic document which includes active properties, and wherein said active properties possess computational power of at least one of altering of documents, notification of other documents, notification of external sources and causing said other documents and/or external sources to perform a function.

12. A method according to claim 11 further comprising:

issuing a request by an application of the document management system for the atomic document;

receiving the request by the atomic document;

sending a request from the atomic document to an atomic bit provider attached to the molecular document to retrieve content of the atomic document;

sending a request from the atomic bit provider to a sub-content of another document of the document management system;

receiving the request from the atomic bit provider by the document having the sub-content;

issuing a request, for the documents with the sub-content receiving the atomic bit provider request, to a corresponding bit provider attached to the document, to retrieve the sub-content for that document;

determining, by the corresponding bit provider, the addresses of the sub-content of the corresponding document;

retrieving, by the corresponding bit provider, the sub-content of the corresponding document;

delivering , by the corresponding bit provider, the retrieved sub-content to the corresponding appropriate document;

retrieving, by the atomic bit provider, the corresponding document containing the retrieved sub-content; and delivering the retrieved corresponding document to the atomic document.

13. The method according to claim 11 wherein the first bit provider is a specialized bit provider capable of recognizing sub-content as being a document having attached properties.

14. The method according to claim 11 further including:

editing the atomic document, wherein the molecular document having the edited sub-content has its content altered.

15. The method according to claim 11 farther including:

editing the molecular document, wherein the atomic document is altered.

16. The method according to claim 11 wherein at least one of the atomic documents is a virtual document.

17. The method according to claim 16 wherein the virtual document is comprised of content from more than a single storage repository.

18. The method according to claim 16 wherein the virtual document is comprised of content less than an entire file of a storage repository.

* * * * *